(12) United States Patent
Alberth et al.

(10) Patent No.: US 9,077,848 B2
(45) Date of Patent: Jul. 7, 2015

(54) SIDE CHANNEL FOR EMPLOYING DESCRIPTIVE AUDIO COMMENTARY ABOUT A VIDEO CONFERENCE

(75) Inventors: William P Alberth, Prairie Grove, IL (US); Dean E Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 337 days.

(21) Appl. No.: 13/183,846

(22) Filed: Jul. 15, 2011

(65) Prior Publication Data

US 2013/0016175 A1    Jan. 17, 2013

(51) Int. Cl.
| | |
|---|---|
| *H04N 7/15* | (2006.01) |
| *H04N 7/14* | (2006.01) |
| *G09B 21/00* | (2006.01) |
| *H04M 3/56* | (2006.01) |

(52) U.S. Cl.
CPC .............. *H04N 7/147* (2013.01); *G09B 21/006* (2013.01); *H04M 3/567* (2013.01); *H04N 7/15* (2013.01)

(58) Field of Classification Search
CPC ..... G09B 21/006; H04M 3/567; H04N 7/147; H04N 7/15
USPC ..................... 348/14.01–14.16; 370/260–261; 709/204
See application file for complete search history.

(56) References Cited

U.S. PATENT DOCUMENTS

| | | | |
|---|---|---|---|
| 5,745,380 A * | 4/1998 | Sandvoss et al. .......... | 379/90.01 |
| 6,205,716 B1 | 3/2001 | Peltz | |
| 6,304,648 B1 | 10/2001 | Chang | |
| 6,606,744 B1 | 8/2003 | Mikurak | |
| 6,629,081 B1 | 9/2003 | Cornelius et al. | |
| 6,671,818 B1 | 12/2003 | Mikurak | |
| 6,688,891 B1 | 2/2004 | Sanford | |
| 6,763,390 B1 | 7/2004 | Kovacevic et al. | |
| 6,778,533 B1 | 8/2004 | Kovacevic et al. | |
| 6,785,336 B1 | 8/2004 | Kovacevic et al. | |
| 6,795,106 B1 | 9/2004 | Cooper | |
| 6,804,266 B1 | 10/2004 | Kovacevic et al. | |
| 6,850,252 B1 | 2/2005 | Hoffberg | |
| 6,885,680 B1 | 4/2005 | Kovacevic et al. | |
| 6,988,238 B1 | 1/2006 | Kovacevic et al. | |
| 6,999,424 B1 | 2/2006 | Kovacevic et al. | |

(Continued)

FOREIGN PATENT DOCUMENTS

| | | | |
|---|---|---|---|
| EP | 1381185 A1 | 1/2004 | |
| EP | 1916833 A1 | 4/2008 | |

(Continued)

OTHER PUBLICATIONS

Patent Cooperation Treaty, International Search Report and Written Opinion of the International Searching Authority for International Application No. PCT/US2012/045204, Sep. 14, 2012, 9 pages.

(Continued)

*Primary Examiner* — Melur Ramakrishnaiah

(74) *Attorney, Agent, or Firm* — Faegre Baker Daniels LLP

(57) ABSTRACT

A side channel, networked with a real-time video conference feed, includes descriptive audio commentary. The side channel also includes an adjustable data handler for adjusting amount of the descriptive audio data correlated to audio commentary regarding the real-time video conference; and a means for prioritizing associated conversation links tied to the real-time video conference.

19 Claims, 3 Drawing Sheets

(56) References Cited

U.S. PATENT DOCUMENTS

| | | | |
|---|---|---|---|
| 7,069,234 | B1 | 6/2006 | Cornelius et al. |
| 7,087,015 | B1 | 8/2006 | Comrie et al. |
| 7,113,546 | B1 | 9/2006 | Kovacevic et al. |
| 7,124,101 | B1 | 10/2006 | Mikurak |
| 7,167,844 | B1 | 1/2007 | Leong et al. |
| 7,185,054 | B1 | 2/2007 | Ludwig et al. |
| 7,266,189 | B1 | 9/2007 | Day |
| 7,610,233 | B1 | 10/2009 | Leong et al. |
| 7,716,077 | B1 | 5/2010 | Mikurak |
| 7,788,100 | B2 | 8/2010 | Slotznick et al. |
| 8,210,848 | B1* | 7/2012 | Beck et al. .................. 434/112 |
| 8,311,200 | B2 | 11/2012 | Kang |
| 8,421,840 | B2 | 4/2013 | Eleftheriadis et al. |
| 2002/0032875 | A1 | 3/2002 | Kashani |
| 2002/0078459 | A1 | 6/2002 | McKay |
| 2003/0085929 | A1 | 5/2003 | Huber et al. |
| 2003/0216831 | A1 | 11/2003 | Hart et al. |
| 2004/0064351 | A1 | 4/2004 | Mikurak |
| 2004/0130442 | A1 | 7/2004 | Breed et al. |
| 2004/0246331 | A1 | 12/2004 | Caspi et al. |
| 2005/0069852 | A1 | 3/2005 | Janakiraman et al. |
| 2005/0131744 | A1 | 6/2005 | Brown et al. |
| 2005/0152524 | A1 | 7/2005 | Carlson et al. |
| 2005/0184867 | A1 | 8/2005 | Osann, Jr. |
| 2005/0235032 | A1 | 10/2005 | Mason, III |
| 2006/0164230 | A1 | 7/2006 | DeWind et al. |
| 2006/0178918 | A1 | 8/2006 | Mikurak |
| 2006/0248210 | A1 | 11/2006 | Kenoyer |
| 2007/0171091 | A1 | 7/2007 | Nisenboim et al. |
| 2007/0186002 | A1 | 8/2007 | Campbell et al. |
| 2007/0265533 | A1 | 11/2007 | Tran |
| 2007/0271338 | A1* | 11/2007 | Anschutz ...................... 709/204 |
| 2007/0273504 | A1 | 11/2007 | Tran |
| 2007/0276270 | A1 | 11/2007 | Tran |
| 2007/0294263 | A1 | 12/2007 | Punj et al. |
| 2008/0004904 | A1 | 1/2008 | Tran |
| 2008/0017235 | A1 | 1/2008 | Chen et al. |
| 2008/0032270 | A1 | 2/2008 | Katz et al. |
| 2008/0062965 | A1 | 3/2008 | Silva et al. |
| 2008/0243005 | A1 | 10/2008 | Jung et al. |
| 2009/0088143 | A1 | 4/2009 | Kim et al. |
| 2009/0112617 | A1 | 4/2009 | Jung et al. |
| 2009/0112621 | A1 | 4/2009 | Jung et al. |
| 2009/0119154 | A1 | 5/2009 | Jung et al. |
| 2009/0132275 | A1 | 5/2009 | Jung et al. |
| 2009/0140887 | A1 | 6/2009 | Breed et al. |
| 2009/0193345 | A1* | 7/2009 | Wensley et al. ............... 715/756 |
| 2009/0316872 | A1 | 12/2009 | Wolf et al. |
| 2010/0031169 | A1 | 2/2010 | Jang et al. |
| 2010/0039498 | A1 | 2/2010 | Liu et al. |
| 2010/0145506 | A1 | 6/2010 | Waugh et al. |
| 2010/0185064 | A1 | 7/2010 | Bandic et al. |
| 2010/0241432 | A1* | 9/2010 | Michaelis .................... 704/260 |
| 2010/0253689 | A1* | 10/2010 | Dinicola et al. .............. 345/467 |
| 2010/0257462 | A1 | 10/2010 | Barrett et al. |
| 2010/0283626 | A1 | 11/2010 | Breed |
| 2010/0299134 | A1* | 11/2010 | Lam ................................. 704/3 |
| 2010/0315482 | A1 | 12/2010 | Rosenfeld et al. |
| 2010/0315905 | A1 | 12/2010 | Lee et al. |
| 2011/0069140 | A1 | 3/2011 | Ortel |
| 2011/0090301 | A1* | 4/2011 | Aaron et al. ................ 348/14.08 |
| 2011/0093273 | A1 | 4/2011 | Lee et al. |
| 2011/0238753 | A1 | 9/2011 | Lueth et al. |
| 2011/0254912 | A1 | 10/2011 | Mock et al. |
| 2011/0295392 | A1 | 12/2011 | Cunnington et al. |
| 2012/0053936 | A1 | 3/2012 | Marvit |
| 2012/0092438 | A1 | 4/2012 | Guzman Suarez et al. |
| 2012/0296914 | A1* | 11/2012 | Romanov et al. ............. 707/741 |
| 2012/0327180 | A1* | 12/2012 | Thorson et al. ............ 348/14.08 |

FOREIGN PATENT DOCUMENTS

| | | | |
|---|---|---|---|
| WO | 0130231 | A2 | 5/2001 |
| WO | 0139028 | A2 | 5/2001 |
| WO | 0139029 | A2 | 5/2001 |
| WO | 0249311 | A2 | 6/2002 |
| WO | 2007081518 | A2 | 7/2007 |
| WO | 2007081519 | A2 | 7/2007 |

OTHER PUBLICATIONS

Patent Cooperation Treaty, International Search Report and Written Opinion of the International Searching Authority for International Application No. PCT/US2012/042011 (CS38203), Nov. 21, 2012, 11 pages.

United States Patent and Trademark Office, "Non-Final Rejection" for U.S. Appl. No. 13/169,512 dated Apr. 15, 2013, 12 pages.

United States Patent and Trademark Office, "Non-Final Rejection" for U.S. Appl. No. 13/169,512 dated Aug. 23, 2013, 14 pages.

United States Patent and Trademark Office, "Non-Final Rejection" for U.S. Appl. No. 13/169,512 dated Dec. 20, 2013, 13 pages.

United States Patent and Trademark Office, "Final Rejection" for U.S. Appl. No. 13/169,512 dated Apr. 30, 2014, 15 pages.

See with your Ears! "The vOICe", internet download: http://www.seeingwithsound.com, 2 pages.

* cited by examiner

VIDEO CONFERENCE SETUP
CAMERA CAPTURES IMAGE OF LOCAL ROOM AND PARTICIPANTS
LOCAL AND REMOTE VIDEO STREAMS SENT TO TABLET OF
VISUALLY CHALLENGED PARTICIPANT

SIDE CHANNEL FOR EMPLOYING DESCRIPTIVE AUDIO COMMENTARY ABOUT A VIDEO CONFERENCE

FIELD OF THE DISCLOSURE

The present disclosure relates generally to video conferencing and more particularly to communicating descriptive audio commentary about a real-time video conference to visually-impaired attendees.

BACKGROUND

Persons having limited sight are disadvantaged in a video conference because much information may not be communicated to them, for example, knowing whether a participant looks tired, or is nodding their acceptance of the presented information, or knowing whether a participant is an authority figure, or whether a participant has worn a special garment or accessory as a signal to other video conference participants.

Accordingly, there is a need for an apparatus that informs a visually-impaired video conference attendee of pertinent information related to the video conference and its purpose.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
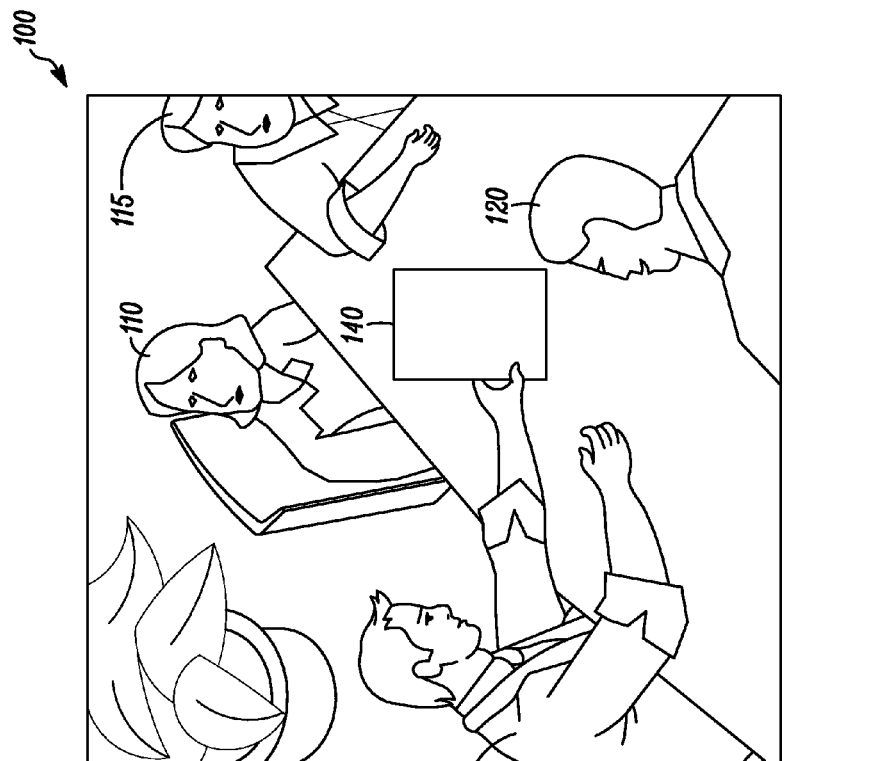
FIG. 1 is an exemplary pictorial illustration of local participants in a video conference setting.
Figure 1:
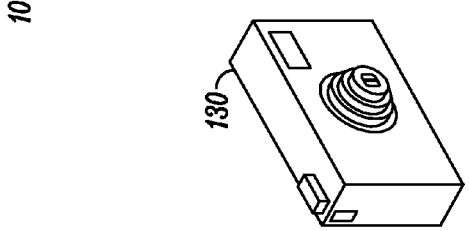

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An electronic device, such as a mobile computing device with an audio/video electronic component is communicatively coupled to at least one video camera during a video conference, and also includes a touchscreen display having video conference participant representations displayed on the touchscreen display. A side channel, networked with the video conference feed, includes descriptive audio commentary. The side channel also includes an adjustable data handler for adjusting the amount of the descriptive audio data correlated to audio commentary regarding a real-time video conference; and a means for prioritizing associated conversation links tied to the real-time videoconference.

FIG. 1 shows an exemplary pictorial illustration of local participants in a video conference setting 100. Local video conference participants may be in attendance to view and hear a presentation. The term "local" is with respect to a reference point associated with the video conference setup. Likewise, remote video conference participants can be in attendance via a communication network to view and hear a presentation. In video conference setting 100, local participants (herein after termed: "lp") include a first male lp 105 displaying a presentation or document 140; a female lp 110, a second male lp 115 at far end of a table; and a third male lp 120 seated across from first male lp 105. A camera 130 is communicatively coupled to the video conference's communication network and captures video images and audio of the local participants and the room in which the video conference is being held. The captured video can be streamed to remote video conference participants. It is envisioned that there may be two groups of video conference participants at each end of a video stream and each group is local to its reference point.

Figure 2:
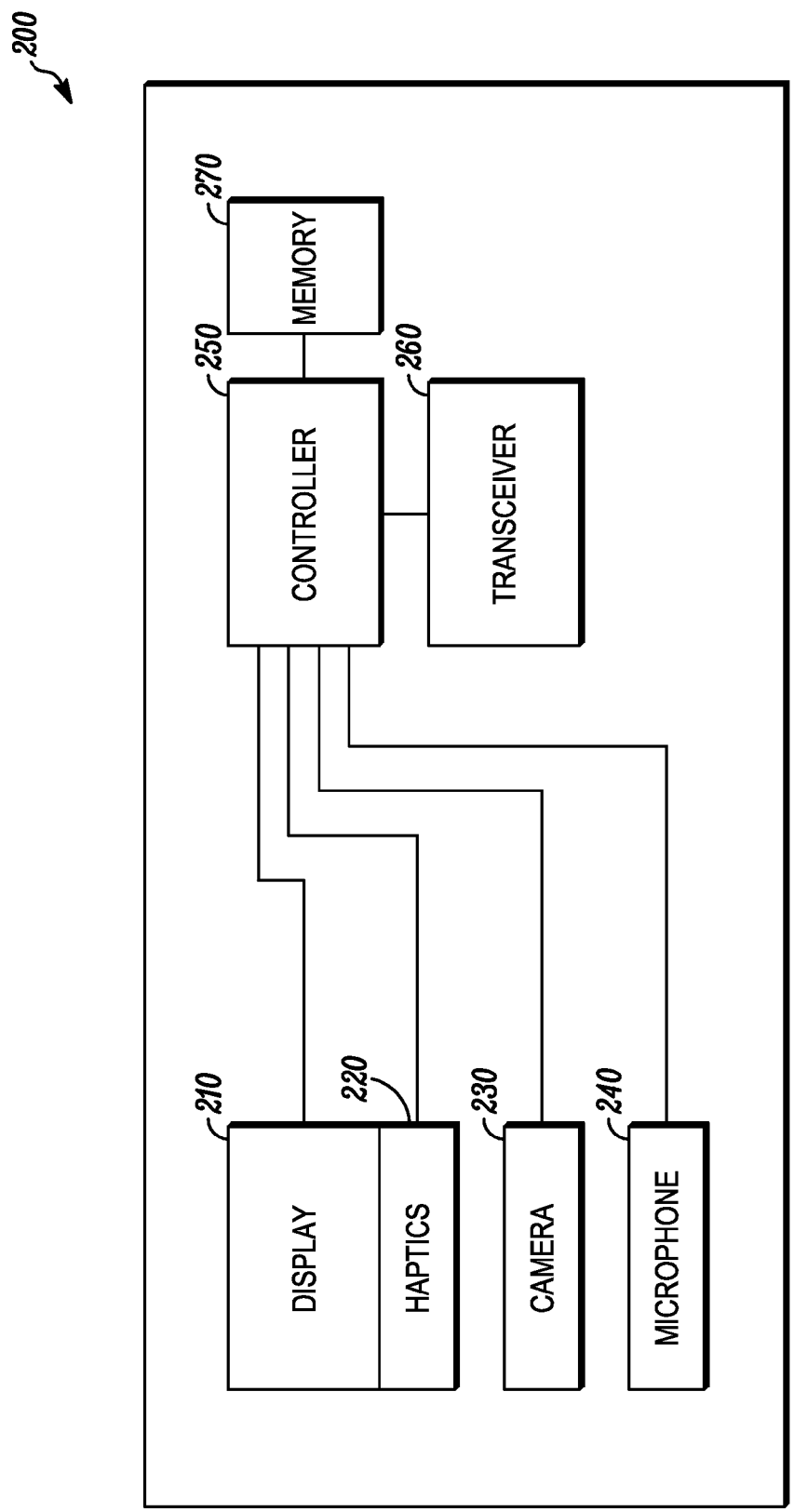
FIG. 2 is an exemplary block diagram of electronic system employed in a mobile computing device.

FIG. 2 shows an exemplary block diagram of electronic system employed in a mobile computing device 200 for receiving the streamed video from camera 130 in FIG. 1. Mobile computing device 200 includes a display 210 having an integrated haptics feedback system 220; a camera 230; a microphone 240; and a controller 250 electronically and communicatively coupled to display 210, haptics feedback system 220, camera 230, and microphone 240. Controller 250 can be comprised of separate, but linked controllers such as a speech-to-text controller and an ongoing commentary controller. A transceiver 260 is also electronically and communicatively coupled to controller 250 for receiving and transmitting data. Data can include image processing data, metadata, audio data, user input data, and communication data (e.g., Braille, texting, email), for example. Memory 270 can store the data either permanently or temporarily and is electronically and communicatively coupled to controller 250. The electronic system may also include a speaker communicatively coupled to the controller (not shown).

Functions in controller 250 can include a speech-to-text function that converts video conference participants' speech into text and creates an identification tag for each video conference participant. Controller 250 may analyze video data received and determine descriptive information about the video such as descriptions of clothes, body language, the location, movements of the participants and other related descriptive data. Other functions may include an ongoing commentary controller that provides feedback on non-verbal cues about the video conference participants. Moreover, controller 250 can prioritize the non-verbal cues and description feedback to avoid unnecessary or unwanted feedback, such as a participant doing excessive scratching of a body part or a participant blowing her nose several times throughout the video conference.

Figure 3:
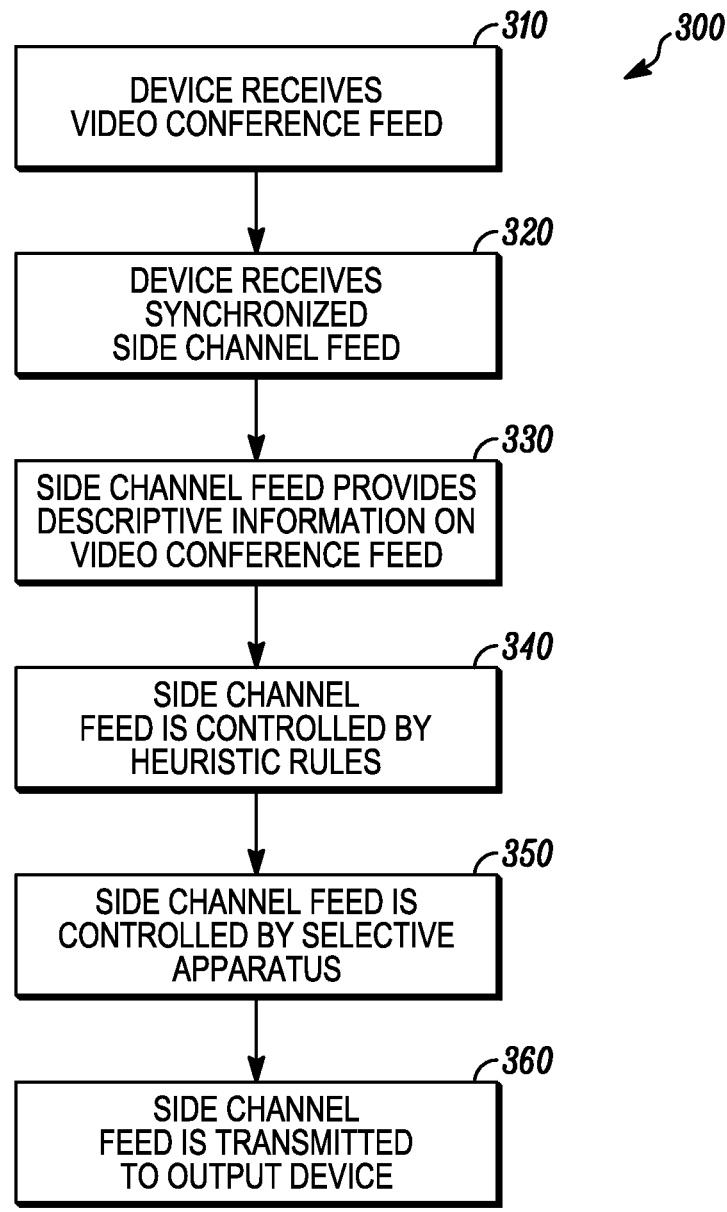
FIG. 3 is an exemplary flowchart.

FIG. 3 shows an exemplary flowchart of a method 300 for providing descriptive audio data about a real-time video conference to an output device.

A mobile computing device with an audio/video electronic component uses Operation 310 to receive a real-time video-conferencing feed. The video-conferencing feed can be protected by authorization codes and/or passwords during an initialization period. The real-time video-conferencing feed includes streamed audio and video content of an ongoing videoconference. The real-time videoconference can show seating arrangement of participants captured by an image capturing device. The real-time videoconference can show actual participants and therefore the garments the actual participants are wearing, including jewelry, headdress, accessories, and uncovered tattoos. The real-time videoconference can show authority figures and preferred interested persons designated by title or seating arrangement or subject matter, for example.

Operation 320 enables the mobile computing device to receive a side channel data feed in addition to the real-time video-conferencing feed. The side channel data feed may or may not be synchronized with the video conference feed and may include an audio feed. In most cases, the side channel feed can be distinct from the real-time video-conferencing to enable greater description of the events and actions of the participants in the real-time video conference. The side channel feed includes descriptive audio commentary comprising information about the real-time videoconference during and after its broadcast to the mobile computing device.

The descriptive data may be generated at the site of the video conferencing, or may be generated at a server connected to the video conferencing equipment via a network, or the descriptive data may be generated at the site receiving the video conferencing data.

Operation 330 provides descriptive audio commentary that can, for example, include descriptive information about the emotions of one or more videoconference participants (e.g., participant displays a pleasing smile versus participant displays a frown or a confused look, excessive swallowing, involuntary facial ticks or is sweating profusely); informs about movement by the participants (e.g., shifting in seat, or leaning forward or backwards or sideways towards another participant, finger tapping, entering or leaving the video-conference room, entering or leaving the viewable area of the camera.); informs about clothes or garments or accessories worn by participants; informs about body language of participants (slouching versus ram-rod or stiff posture); informs about the seating arrangements or the aesthetic ambiance of the room or geographical location where meeting is being conducted (e.g., low-light versus bright light, indoor versus outdoor, paint on walls versus scenery through a window).

Operation 340 may provide audio commentary on the real-time video-conferencing while being subject to rules that enable filtering of the descriptive audio data or information corresponding to the descriptive audio commentary. The rules can be heuristic (i.e., learned over time and experience), or can be predetermined. The rules may limit the descriptive audio data, if the user or operator of the mobile computing device with audio/video electronic component is talking. The rules may enable more descriptive audio data to be delivered to the mobile computing device, if the operator of the mobile computing device is not talking. The rules may prioritize the descriptive data based on an input that one or more persons are decision makers or authority figures or influential persons or persons of interest. Likewise, the rules may prioritize the descriptive data based on a specific participant speaking. That is specific conversation links associated with the real-time video conferencing and attributable to one or more speakers can be given higher or lower priority. In addition, the operator may establish his own rules that impact the amount of descriptive data about the real-time video-conferencing that is provided to the mobile computing device.

Operation 350 enables the side channel feed to be controlled by an operator of the mobile computing device via a selectivity apparatus, such as a slider mechanism, dial, or other graphical user input, for example. The selectivity apparatus enables the operator to maximize the descriptive audio data received by the mobile computing device and minimize the real-time video conference audio. Alternatively, the selectivity apparatus enables the operator to maximize the real-time video conference audio and severely limit or stop the descriptive audio data sent to the mobile computing device. That is, the selectivity apparatus can reduce either the descriptive data or the real-time video-conferencing audio to a quantitative amount approaching nearly zero.

Operation 360 enables the side channel feed to be transmitted to an output device, such as a headset comprised of one or more speakers or a stand-alone speaker system comprised of one or more speakers, or an integrated speaker set that is integrated or communicatively coupled to a controller of the mobile computing device. Any speaker system can be electronically tethered or wireless, for example, via Bluetooth. Additional information may be coupled or transmitted along with the side channel feed. The additional information can include non-verbal cues can be commented upon or fed back to a limited sighted person via Braille, large format text, haptic output, or audio.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Additionally, a non-transitory machine readable storage device, having stored thereon a computer program that include a plurality of code sections comprising code for implementing the method described herein can be used.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A side channel for descriptive audio commentary when networked with a real-time video conference, comprising:
   an adjustable data handler for adjusting an amount of descriptive data for audio commentary regarding the real-time video conference, wherein the amount of descriptive data is decreased during talking by real-time video conference participants and descriptive data is increased during an absence of talking by real-time video conference participants; and
   a means for prioritizing associated conversation links tied to the real-time video conference.

2. The side channel according to claim 1, wherein the side channel provides additional information to enhance visual aspect of the real-time video conference.

3. The side channel according to claim 2, wherein the additional information is selected from the group consisting of audio, large format text, Braille output, or haptic output.

4. The side channel according to claim 3, further including a speaker, and wherein the additional information is output via the speaker.

5. The side channel according to claim 2, wherein the additional information is generated from a server or at a mobile computing device.

6. The side channel according to claim 1, further including a slider mechanism coupled to the adjustable data handler.

7. The side channel according to claim 6, wherein the slider mechanism controls the adjustable data handler, the data handler controlled responsive to the slider mechanism to output descriptive audio in a range between full audio from the real-time video conference with nearly zero descriptive data and all descriptive data with nearly zero real-time video conference audio.

8. The side channel according to claim 1, wherein the adjustable data handler automatically reduces descriptive data associated with the real-time video conference and the communicative participation by a user of the side channel.

9. The side channel according to claim 8, wherein the amount of reduction of descriptive data is dependent on the amount of communicative participation generated by the user of the side channel.

10. The side channel according to claim 1, further comprising a selectivity filter wherein the descriptive audio commentary is selectable according to the group consisting of at least one of: side channel user interest, video conference participant deemed a decision maker, and side channel user selection.

11. The side channel according to claim 1, wherein the descriptive audio commentary includes descriptive information about video conference participants selected from the group consisting of at least one of: emotions, body movement, body posture, garments, and seating arrangement.

12. A method for employing descriptive audio commentary of a real-time video conference feed via a side channel, comprising the steps of:
   adjusting, using an adjustable data handler coupled to an electronic device that includes an audio-video electronic component and receives the real-time video conference, an amount of descriptive audio data correlated to the real-time video conference; and
   prioritizing, using the electronic device, associated links tied to the real-time video conference, wherein the prioritizing includes prioritizing preferred non-verbal cues higher than non-preferred non-verbal cues by providing more descriptive audio data regarding the preferred non-verbal cues.

13. The method according to claim 12, further comprising the step of:
   automatically reducing descriptive audio commentary associated with the real-time video conference and communicative participation by a user of the side channel.

14. The method according to claim 13, wherein the amount of reduction of descriptive data is dependent on the amount of communicative participation generated by the user of the side channel.

15. The method according to claim 12, further comprising the step of:
   selecting the descriptive audio commentary according to the group consisting of at least one of: side channel user interest, video conference participant deemed a decision maker, and side channel user selection.

16. The method according to claim 12, further comprising the step of:
   employing descriptive information about video conference participants selected from the group consisting of at least one of: emotions, body movement, body posture, garments, and seating arrangement.

17. A method for providing descriptive audio data about a real-time video conference to an output device, comprising the steps of:
- receiving the real-time video conference on a mobile computing device comprising an audio/video electronic component;
- receiving a side channel audio feed comprising descriptive audio commentary about the real-time video conference;
- controlling the side channel audio feed with a user selectivity apparatus coupled to an adjustable data handler for adjusting amount of the descriptive audio data for the descriptive audio commentary about the real-time video conference, the adjustable data handler limiting descriptive audio data during talking and increasing descriptive audio data when participants are not talking; and
- transmitting the side channel audio feed to the output device.

18. The method according to claim 17, wherein the side channel audio feed is transmitted over a stand-alone speaker or a headset.

19. The method according to claim 17, further comprising the step of:
- transmitting additional information to enhance visual aspect of the real-time video conference; wherein the additional information is selected from the group consisting of audio, large format text, Braille output, or haptic output.

* * * * *